Nov. 25, 1952  W. E. RENICK  2,619,112
PRESSURE RELIEF VALVE
Filed June 12, 1946
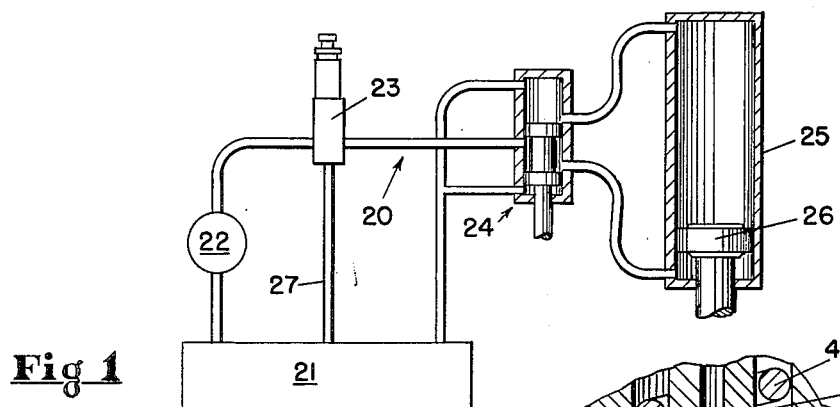
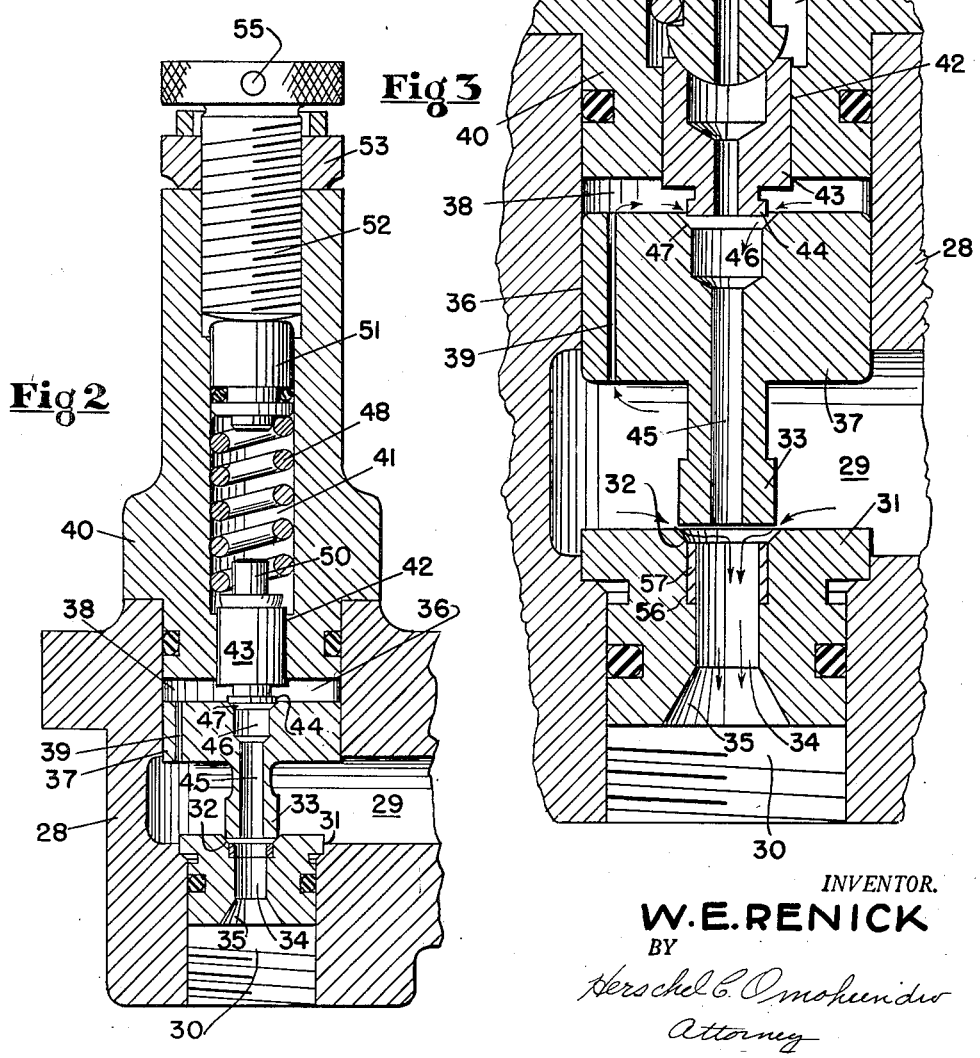
INVENTOR.
W. E. RENICK
BY
Herschel C. Omohundro
Attorney Patented Nov. 25, 1952

2,619,112

UNITED STATES PATENT OFFICE 2,619,112

PRESSURE RELIEF VALVE

Wendell E. Renick, Grove City, Ohio, assignor to The Denison Engineering Company, Columbus, Ohio, a corporation of Ohio Application June 12, 1946, Serial No. 676,206

1 Claim. (Cl. 137—490)

This invention relates generally to hydraulic apparatus and is particularly directed to valve mechanism for use in hydraulic circuits to prevent the pressure therein from exceeding a predetermined maximum, such valves being known in the trade as pressure relief valves.

An object of this invention is to provide a pressure relief valve which will have a relatively narrow operating range or, in other words, the pressure at which the valve commences to open will be only slightly below the predetermined pressure for which the valve has been set, the valve offering sufficient resistance to flow therethrough as to maintain the requisite pressure without appreciable fluctuation.

Another object of the invention is to provide a pressure relief valve having an unbalanced piston valve which is operative in response to pressure differentials on opposite sides thereof and to provide a second piston valve of smaller size than the first which second piston valve is also responsive to pressure differentials on opposite sides thereof to control the creation of pressure differentials for operating the first piston valve, the smaller piston valve being biased toward a closed position by a coil spring which spring also serves to bias the first valve toward a closed position, the smaller piston valve transmitting the force from the spring to the larger piston valve.

A further object of the invention is to provide a pressure relief valve having a chamber for the reception of the pressure to be controlled and a piston valve for governing the flow from the chamber to the exhaust, a passage being provided to permit pressure equalization on opposite sides of the piston valve, the side of the piston valve exposed to pressure tending to close the valve having a greater area than the other side, the valve being further provided with a second piston valve for controlling the flow of fluid from the side of the valve on which pressure tends to move the same toward a closed position, to the exhaust whereby, upon opening movement of the second piston valve pressure differentials will exist which will tend to move the first piston valve toward an open position so that fluid may flow from the chamber to the exhaust, opening movement of the first valve tending to diminish the flow of fluid from the control side of the piston whereby the valve mechanism will be rendered more sensitive.

A still further object of the invention resides in the provision of a pressure relief valve having a chamber for the reception of the fluid to be controlled and a piston valve dividing this chamber to provide a control chamber, the first and second chambers being connected by a reduced passage wherein the chambers will contain fluid at the same or equal pressures when the valve is closed, a passage also being provided to connect the control chamber with the exhaust which passage is also controlled by a valve normally maintained in closed position by a spring, the latter valve being responsive to pressure increases in the control chamber to move toward an open position wherein the control chamber will be connected with exhaust, thus permitting the pressure to fall in the control chamber to such an extent that the pressure to be controlled will move the main valve toward an open position, thus connecting the first chamber directly with exhaust to prevent further increase in pressure in the first chamber.

Another object of the invention is to provide a relief valve having means for breaking up or deflecting the oil stream as it flows from the valve at high velocity to eliminate any tendency of the valve to cause foaming or aeration of the oil. This means consists of a peculiar seat construction in which a shoulder is formed in the path of the oil flowing through the valve, this shoulder serving to direct oil from the sides of the valve seat toward the center thereof where the oil thus deflected from all sides will meet, change direction of movement and pass on to the exhaust.

Still another object of the invention is to provide a pressure relief valve having a main poppet valve for controlling the flow of fluid through the valve and a pilot valve of the poppet type for governing fluid flow from a control chamber to the exhaust, the latter flow of fluid serving to cause the actuation of the main valve.

An object of the invention also is to provide a pressure relief valve having a chamber and an exhaust port, the chamber being connected with a pair of aligned piston cylinders and to provide pistons in such cylinders, one of the pistons being larger than the other and controlling the main flow through the valve, the smaller piston serving to control pressure differentials employed to operate the first piston valve, the second piston valve being so formed that upon being opened, it will present more surface area to the pressure tending to move the same toward an open position and its opening movement will thus be increased, thereby increasing the sensitivity of the valve.

Further objects and advantages of the present invention will be apparent from the following description, reference being had to the accompanying drawings wherein a preferred form of embodiment of the invention is clearly shown.

In the drawings:

Fig. 1 is a diagrammatic view of a hydraulic circuit in which a relief valve formed in accordance with the present invention is connected.

Fig. 2 is a detail vertical longitudinal sectional view taken through the relief valve shown in the circuit in Fig. 1; and Fig. 3 is an enlarged sectional view showing the parts of the relief valve in open position.

Referring more particularly to Fig. 1 of the drawing, the numeral 20 represents the hydraulic circuit in its entirety. This hydraulic circuit includes reservoir 21, a motor driven pump 22, the relief valve 23, a controlling mechanism 24, and a power cylinder 25 in which a piston 26 is mounted for reciprocation. As is well-known in the art, the relief valve is provided for the purpose of preventing the pressure in the hydraulic system from exceeding a predetermined value. The relief valve is such that, when the pressure approaches this predetermined value, the valve will commence to discharge fluid or permit the same to by-pass back to the reservoir 21 through a line 27.

In Figs. 2 and 3 the relief valve, comprising the present invention, has been illustrated in detail. This valve includes a body 28 in which chamber 29 is formed. This chamber connects with the lines leading from the pump 22 to the valve 23 and from the latter to the control valve mechanism 24. The body has a port 30 formed therein which is connected with the return line 27, this port being termed "an exhaust port." Between the chamber 29 and the exhaust port 30 the body has an insert 31 disposed therein. This insert forms a valve seat 32 for engagement by a poppet type valve element 33. The seat 32 is arranged around a central opening 34 in the insert 31 which connects the exhaust port 30 and the chamber 29. At its lower end of the opening, 34 flares outwardly as at 35 so that any tendency for the fluid to expand after passing through the opening 34 will not be obstructed.

In axial registration with the insert 31 the body 28 is provided with a piston cylinder 36, this cylinder slidably receiving a piston 37 which forms a part of the valve element 33. While the valve element and the piston are illustrated as being constructed from a single piece of material it should be obvious that these elements could be formed from different materials and joined together in any suitable manner. The piston 37 serves to provide a control chamber 38 at the upper end of the piston cylinder 36 which control chamber is connected with the chamber 29 by a reduced passage 39 formed in the piston, this passage establishing limited communication between the chamber 29 and the control chamber 38 whereby fluid pressure in these chambers will be equalized when the valve 33 is closed.

The open upper end of the piston cylinder 36 is closed by a body 40 having a central, longitudinally extending bore 41, the lower end of which is reduced as at 42 to receive a piston 43, this piston forming part of a secondary or pilot valve 44. Valve 44 is employed to control the flow of fluid from the control chamber above piston 37 through an axial passage 45 formed in the piston 37 and valve 33. The upper end of this passage is enlarged as at 46 to form a seat 47. The central bore 41 in the body 40 receives a coil spring 48 which has one end in engagement with an adapter 50 and the other end in abutment with a slidable plug 51, this member being engaged in turn at its outer end by an adjusting screw 52. The position of this screw is maintained by a lock nut 53. This screw and the lock nut have enlarged rounded heads through which bar openings 55 are formed for the reception of a tool to facilitate turning movement thereof. The piston 43 and the adapter 50 have openings formed axially thereof so that the interior of the body 40 will be connected with the exhaust port. The upper end of the opening in the piston 43 is counterbored to receive the spherically shaped lower end of the adapter 50 and provide a swivel joint between these elements. Thus any tendency of the spring 48 to twist, turn, or tilt will not be transmitted to the piston 43.

The insert 31, the body 40, and the plunger 51 are provided with annular grooves for the reception of packing rings to prevent the escape of fluid under pressure at these locations.

At the upper end of the central opening 34 in the insert 31 there is provided a counterbored portion 56 which receives a ferrule 57, the upper end of which terminates in juxtaposition with the lower edge of the tapered valve seat 32. The relation of the seat and the ferrule provides an inwardly extending shoulder at the lower end of the seat which shoulder functions to deflect fluid flowing at high velocity over the seat toward the center of the opening 34. When this inwardly rushing fluid reaches the center it is redirected downwardly through the opening 34 to the line 27. By breaking up and redirecting the fluid after it passes over the seat the velocity is reduced and any tendency to foam and absorb air is eliminated.

The relief valve operates as follows: Fluid from the pump 22 is introduced to the chamber 29 through which it flows while the system is in operation. As the pressure on this fluid builds up it will be transmitted through the passage 39 to the piston cylinder 36 at the upper side of the piston 37. As long as valve 44 is seated the pressures in these chambers will be substantially equal. It will be noted from Figs. 2 and 3 that the diameter of the valve 44 is slightly less than the diameter of the valve element 33, this difference causing a differential in effective pressure applied to the piston, the result of which is to urge the piston downwardly to firmly hold the valve 33 on the seat 32. This force is augmented by the force of the spring 48 which is transmitted through the adapter 50 and piston 43 to the piston 37. Since pistons 37 and 43 are separate parts, the fluid pressure in the piston cylinder 36 will be transmitted to the under side of piston 43 and will tend to move this piston upwardly in opposition to the force of the spring 48. It will thus be seen that when the pressure increases in the piston cylinder 36 more force will be applied to this piston to move or tend to move valve 44 away from its seat 47. When pressure in piston cylinder 36 increases sufficiently valve 44 will move away from valve seat 47 permitting fluid to flow from the piston cylinder 36 through the opening 45 to the exhaust port. As long as the flow past valve 44 does not exceed the flow through passage 39, the pressure in piston chamber 36 will not change. When, however, valve 44 moves away from seat 47 far enough to permit more fluid to flow through the passage 45 than can flow through passage 39, fluid pressure in piston cylinder 36 will start to fall, thus creating a pressure differential on opposite sides of the piston 37 which will move piston 37 upwardly, withdrawing valve element 33 from seat 32. Fluid may then escape from chamber 29 directly to the exhaust port 30 and return line 27. As long as the fluid being exhausted in this manner added to the fluid being used in the system does not exceed the fluid being delivered by the pump 22, the pressure in chamber 29 will continue to increase and more pressure will be applied to the under side of the piston 37.

It will, of course, be observed that as the piston 37 moves upwardly to draw valve 33 away from seat 32 it will in turn move seat 47 closer to valve 44. When this action occurs pressure will immediately build up in piston chamber 36 and on the under side of piston 43 causing the latter to move still further in opposition to the force of the spring. When valve 33 has moved a sufficient distance from seat 32 to by-pass all excess fluid being supplied to the system, the pressure in the system will remain substantially stabilized; if the pressure in chamber 29 should start to recede, spring 48 will immediately move valve elements 44 and 33 toward their seats; pressure will then increase in the control chamber at the upper end of the piston cylinder 36 and piston 37 will then move further toward a valve closing position.

It will be noted that when valve 44 moves away from seat 47 an additional downwardly facing area of this valve is exposed to the fluid pressure in cylinder 36 which increases the force tending to move the valve and piston 43 toward an open position. It will also be noted that the opening of valve 44 exposes an additional upwardly facing area on piston 37 to the pressure in cylinder 36 which slightly increases the force tending to hold valve 33 closed. When the valves are thus moved in opposite directions the control chamber 36 will have its pressure more rapidly lowered thus creating a greater differential between chambers 29 and cylinder 36 so that piston 37 will be more effectively controlled.

From the foregoing, it will be observed that the fluid pressure relief valve has been provided which because of its sensitivity will have a narrow range between the point at which fluid is started to discharge and the maximum pressure for which the relief valve has been set.

While the form of embodiment of the present invention, as herein disclosed, constitutes a preferred form, it is to be understood that other forms might be adopted, all falling within the scope of the claim which follows.

I claim:

A pressure relief valve comprising a body having a chamber and inlet and outlets ports communicating therewith; a valve seat between said chamber and said outlet port; said body having a piston chamber in registration with said valve seat; a piston valve, the piston of which is disposed for movement in said piston chamber, the valve portion cooperating with said seat to control communication between said inlet and outlet ports, said piston dividing said piston chamber into first and second pressure zones; a restricted passageway providing continuous limited communication between said pressure zones, said piston valve having a passage connecting said second pressure zone and said outlet port; a second valve seat in the last-mentioned passage; said body having a second reduced piston chamber in registration with said second valve seat and opening into said second pressure zone; a second piston valve having its piston portion disposed for movement in said second piston chamber and the valve portion disposed for cooperation with the second valve seat; and spring means tending to urge said piston valves toward the respective seats therefor.

WENDELL E. RENICK.

REFERENCES CITED

The following references are of record in the file of this patent:

UNITED STATES PATENTS

| Number | Name | Date |
| --- | --- | --- |
| 230,828 | Shaw | Aug. 3, 1880 |
| 235,748 | Crisp | Dec. 21, 1880 |
| 534,514 | Mellin | Feb. 19, 1895 |
| 832,178 | Weinland | Oct. 2, 1906 |
| 851,165 | Fernold | Apr. 23, 1907 |
| 973,551 | Osborne | Oct. 25, 1910 |
| 1,138,241 | Newton | May 4, 1915 |
| 1,357,837 | Bouvierir | Nov. 2, 1920 |
| 2,043,453 | Vickers | June 9, 1936 |
| 2,375,410 | Gondek | May 8, 1945 |

FOREIGN PATENTS

| Number | Country | Date |
| --- | --- | --- |
| 2,234 | England | June 17, 1875 |